United States Patent
Sasajima et al.

(10) Patent No.: US 8,937,130 B2
(45) Date of Patent: Jan. 20, 2015

(54) CONJUGATED DIENE RUBBER, RUBBER COMPOSITION, CROSS-LINKED RUBBER, AND TIRE

(75) Inventors: Tatsuo Sasajima, Tokyo (JP); Takeshi Karato, Tokyo (JP); Takeshi Sugimura, Tokyo (JP)

(73) Assignee: Zeon Corporation, Tokyo (JP)

(*) Notice: Subject to any disclaimer, the term of this patent is extended or adjusted under 35 U.S.C. 154(b) by 0 days.

(21) Appl. No.: 13/995,422

(22) PCT Filed: Dec. 14, 2011

(86) PCT No.: PCT/JP2011/078949
§ 371 (c)(1),
(2), (4) Date: Jun. 18, 2013

(87) PCT Pub. No.: WO2012/086496
PCT Pub. Date: Jun. 28, 2012

(65) Prior Publication Data
US 2013/0267649 A1    Oct. 10, 2013

(30) Foreign Application Priority Data
Dec. 24, 2010    (JP) ................................. 2010-288641

(51) Int. Cl.
| | | |
|---|---|---|
| *B60C 1/00* | (2006.01) | |
| *C08F 36/00* | (2006.01) | |
| *C08F 136/00* | (2006.01) | |
| *C08F 236/10* | (2006.01) | |
| *C08C 19/44* | (2006.01) | |
| *C08L 53/02* | (2006.01) | |
| *C08K 3/04* | (2006.01) | |

(52) U.S. Cl.
CPC ............... *C08F 236/10* (2013.01); *C08C 19/44* (2013.01); *B60C 1/00* (2013.01); *C08L 53/025* (2013.01); *C08K 3/04* (2013.01)
USPC .......................... 524/575; 525/332.9; 526/335

(58) Field of Classification Search
CPC ... C08F 236/10; C08L 53/025; C08L 19/006; B60C 1/00; C08C 19/36; C08J 3/24
USPC .......................... 524/575; 525/332.9; 526/335
See application file for complete search history.

(56) References Cited

U.S. PATENT DOCUMENTS

| | | | |
|---|---|---|---|
| 4,647,625 A | 3/1987 | Aonuma et al. | |
| 4,742,117 A | 5/1988 | Tsutsumi et al. | |
| 5,001,196 A | 3/1991 | Kawanaka et al. | |
| 5,070,148 A | 12/1991 | Hsu et al. | |
| 5,175,211 A | 12/1992 | Sanada et al. | |
| 2002/0086952 A1* | 7/2002 | Chino et al. | ............... 525/327.6 |
| 2002/0179218 A1 | 12/2002 | Pierre et al. | |
| 2003/0032746 A1* | 2/2003 | Schwindeman et al. | ...... 526/178 |
| 2004/0260002 A1 | 12/2004 | Robert et al. | |
| 2006/0148964 A1 | 7/2006 | Lasage | |
| 2006/0148994 A1 | 7/2006 | Lesage | |
| 2011/0190440 A1 | 8/2011 | Ohta et al. | |
| 2013/0012651 A1 | 1/2013 | Sasajima et al. | |

FOREIGN PATENT DOCUMENTS

| | | |
|---|---|---|
| CN | 101663352 A | 3/2010 |
| EP | 2 003 146 A2 | 12/2008 |
| JP | 61-42552 A | 3/1986 |
| JP | 61-171749 A | 8/1986 |
| JP | 63-205336 A | 8/1988 |
| JP | 64-81811 A | 3/1989 |
| JP | 1-249812 A | 10/1989 |
| JP | 4-249511 A | 9/1992 |
| JP | 2003-531257 A | 10/2003 |
| JP | 2005-507441 A | 3/2005 |
| JP | 2006-525392 A | 11/2006 |
| JP | 2006-525393 A | 11/2006 |
| WO | WO 2007/114203 A1 | 10/2007 |
| WO | WO 2011/105362 A1 | 9/2011 |

OTHER PUBLICATIONS

International Search Report for PCT/JP2011/078949 dated Mar. 19, 2012.
Mitov et al., "Modification of Styrene-Isoprene Copolymers-1. End-Terminated Products", Eur. Polym. J., vol. 28, No. 7, 1992, pp. 765-770.
Extended European Search Report dated Aug. 12, 2014 for Application No. 11851672.3.
Chinese Office Action for Application No. 201180061872.3 dated Oct. 23, 2014.

* cited by examiner

*Primary Examiner* — William Cheung
(74) *Attorney, Agent, or Firm* — Birch, Stewart, Kolasch & Birch, LLP

(57) ABSTRACT

A conjugated diene rubber of the present invention is prepared from conjugated diene polymer chains, wherein the conjugated diene polymer chains each has an active end at one end and an isoprene block at least at the other end, the isoprene block contains 70 wt % or more isoprene monomer units, and the active ends of at least part of the conjugated diene polymer chains are modified with a compound having a >C=O group as a functional group. This provides (i) a tire that has an excellent strength, excellent low-heat buildup property, and excellent wet grip property and (ii) a rubber composition and a conjugated diene rubber that are suitably used to produce the tire.

11 Claims, No Drawings

CONJUGATED DIENE RUBBER, RUBBER COMPOSITION, CROSS-LINKED RUBBER, AND TIRE

This application is a 35 U.S.C. 371 national stage patent application of international patent application PCT/JP2011/078949, filed on Dec. 14, 2011, which claims foreign priority to JP 2010-288641 filed on Dec. 24, 2010, the entire content of which is incorporated herein by reference.

TECHNICAL FIELD

The present invention relates to a conjugated diene rubber, a rubber composition, a cross-linked rubber, and a tire. More specifically, the present invention relates to: a conjugated diene rubber; a rubber composition containing the conjugated diene rubber; a cross-linked rubber prepared by cross-linking the rubber composition; and a tire containing the cross-linked rubber.

BACKGROUND ART

In recent years, there has been an urgent demand for fuel-efficiency of automobile tires from the perspective of environmental concerns and resource protection. For safety reasons, there has also been a demand for excellent wet grip property, dry traction, and driveability of automobile tires.

Conventionally, a rubber composition containing carbon black as filler has been widely used for tires. However, when synthetic rubber and carbon black are mixed and kneaded, if the carbon black is not sufficiently dispersed, a tire prepared from such a mixture will not provide good performances such as a good low-heat buildup property.

In view of the circumstances, there has been considered a technique to cause, by reacting a certain modifying agent with a polymer, a rubber itself to have an affinity for carbon black. For example, Patent Literature 1 discloses a conjugated diene rubber prepared by reacting a certain tin halide compound, which has a good affinity for carbon black, with active ends of polymer chains each of which has an active end at one end and an isoprene block at the other end.

CITATION LIST

Patent Literatures

Patent Literature 1
Japanese translation of PCT International Publication, Tokuhyo, No. 2003-531257 A

SUMMARY OF INVENTION

Technical Problem

However, in light of a demand for better performance of automobile tires in recent years, even a cross-linked rubber prepared from a rubber composition specifically described in Patent Literature 1 may not be good enough in terms of low-heat buildup property and wet grip property.

The present invention has been made in view of the foregoing problem, and it is an object of the present invention to obtain a conjugated diene rubber from which a rubber composition is prepared, which rubber composition provides a tire that has excellent tensile strength, excellent low-heat buildup property, and excellent wet grip property.

Solution to Problem

The inventors of the present invention conducted diligent work for attaining the object, and found that it is possible, by modifying an active end(s) of at least part of conjugated diene polymer chains each of which has an active end at one end and an isoprene block at least at the other end with a compound having a certain functional group, to obtain a conjugated diene rubber suitable for a rubber composition from which a tire is prepared which has an excellent tensile strength, excellent low-heat buildup property, and excellent wet grip property. On the basis of this finding, the inventors completed the present invention.

In order to attain the object, a conjugated diene rubber of the present invention is a conjugated diene rubber prepared from conjugated diene polymer chains, wherein the conjugated diene polymer chains each has an active end at one end and an isoprene block at least at the other end, the isoprene block contains 70 wt % or more isoprene monomer units, and the active ends of at least part of the conjugated diene polymer chains are modified with a compound having a $>C=O$ group as a functional group.

The present invention further provides a rubber composition including: 100 parts by weight of a rubber component which contains the conjugated diene rubber; and 10 parts by weight to 200 parts by weight of carbon black.

The present invention further provides a cross-linked rubber which is prepared by cross-linking the rubber composition.

The present invention further provides a tire including the cross-linked rubber.

Advantageous Effects of Invention

According to the present invention, it is possible to provide a conjugated diene rubber suitably used to prepare a rubber composition for a tire that has an excellent tensile strength, excellent low-heat buildup property, and excellent wet grip property.

DESCRIPTION OF EMBODIMENTS

The following description will discuss a conjugated diene rubber and the like of the present invention. Note that, in this specification, the range "A to B" (where A and B are numerical values) means not less than A but not more than B.

A conjugated diene rubber of the present invention is a conjugated diene rubber prepared from conjugated diene polymer chains, wherein the conjugated diene polymer chains each has an active end at one end and an isoprene block at least at the other end, the isoprene block contains 70 wt % or more isoprene monomer units, and the active ends of at least part of the conjugated diene polymer chains are modified with a compound having a certain functional group.

[Conjugated Diene Polymer Chain]

Conjugated diene polymer chains from which a conjugated diene rubber of the present invention is to be prepared are not limited to any particular kind, provided that each of the conjugated diene polymer chains (i) contains conjugated diene monomer units and (ii) has an active end at one end and has an isoprene block at least at the other end, which isoprene block contains 70 wt % or more isoprene monomer units. It is preferable that the conjugated diene polymer chains contain 50 wt % to 100 wt % conjugated diene monomer units and 0 wt % to 50 wt % aromatic vinyl monomer units.

Each of the conjugated diene polymer chains can be obtained by (i) subjecting isoprene monomers (monomer mixture) containing a predetermined amount of isoprene monomers to living polymerization in an inert solvent with the use of a polymerization initiator, thereby forming an isoprene block having an active end, and then (ii) allowing monomers (monomer mixture) containing conjugated diene monomers to bind to the isoprene block having the active end so that the monomers (monomer mixture) containing the conjugated diene monomers are subjected to living polymerization. It is preferable that the monomers (monomer mixture) containing conjugated diene monomers further contain an aromatic vinyl monomer(s).

(Isoprene Block)

An isoprene block in this specification refers to a part, of a conjugated diene polymer chain, which is composed mainly of isoprene monomer units. The isoprene block contains the isoprene monomer units in an amount of 70 wt % or more, preferably 80 wt % or more, and more preferably 90 wt % or more. When isoprene blocks of the conjugated diene polymer chains contain 70 wt % or more isoprene monomer units, when a conjugated diene rubber made from the conjugated diene polymer chains is mixed with carbon black, there is a good affinity between the conjugated diene rubber and the carbon black. A tire containing a rubber composition prepared from the conjugated diene rubber has an excellent low-heat buildup property.

A conjugated diene polymer chain only needs to have an isoprene block at least at an end opposite to the active end. The conjugated diene polymer chain can also have another isoprene block(s) in another part(s) thereof. For example, the conjugated diene polymer chain can have the another isoprene block at the active end. Note, however, that a conjugated diene polymer chain having an isoprene block only at the end opposite to the active end is preferable, in view of productivity. Since at least an end opposite to the active end of the conjugated diene polymer chain is constituted by an isoprene block, when a conjugated diene rubber made from such conjugated diene polymer chains is mixed with carbon black, there is a good affinity between the conjugated diene rubber and the carbon black. A tire containing a rubber composition prepared from the conjugated diene rubber has an excellent low-heat buildup property.

A weight-average molecular weight of the isoprene block, particularly the isoprene block which is at the end opposite to the active end, is preferably 500 to 20,000, more preferably 1,000 to 15,000, and even more preferably 1,500 to 10,000. When the weight-average molecular weight of the isoprene block is 500 or more, a tire produced will have an excellent strength. When the weight-average molecular weight of the isoprene block is 20,000 or less, a tire produced will have an excellent low-heat buildup property.

A molecular weight distribution, which is represented as a ratio (Mw/Mn) of weight-average molecular weight (Mw) to number-average molecular weight (Mn), of the isoprene block is preferably 1.0 to 1.5, more preferably 1.0 to 1.4, and even more preferably 1.0 to 1.3. When the molecular weight distribution (Mw/Mn) of the isoprene block falls within such ranges, it is easier to produce a conjugated diene rubber of the present invention.

Other monomers which can be copolymerized with the isoprene monomers used to obtain an isoprene block are not limited to any particular kind, provided that such other monomers can be copolymerized with the isoprene monomers. For example, 1,3-butadiene, styrene and/or α-methyl styrene can be used. Of these, styrene is preferable. The amount of such other monomers with respect to a sum of the amount of the isoprene monomers and the amount of such other monomers is preferably 30 wt % or less, more preferably 20 wt % or less, and even more preferably 10 wt % or less.

There is no particular limitation on the inert solvent for use in polymerization of the isoprene monomers (monomer mixture), provided that the inert solvent (i) is typically used for solution polymerization and (ii) does not inhibit a polymerization reaction. Specific examples of the inert solvent encompass: chain aliphatic hydrocarbons such as butane, pentane, hexane, heptane, and 2-butene; alicyclic hydrocarbons such as cyclopentane, cyclohexane, and cyclohexene; and aromatic hydrocarbons such as benzene, toluene, and xylene. The inert solvent is used in such an amount that monomer concentration is, for example, 1 wt % to 50 wt %, and preferably 10 wt % to 40 wt %.

There is no particular limitation on the polymerization initiator for use in preparing the isoprene block, provided that the polymerization initiator is capable of initiating living polymerization of the isoprene monomers (monomer mixture) to thereby give polymer chains each having an active end. Preferable examples of the polymerization initiator encompass: organic alkali metal compounds and organic alkaline-earth metal compounds; and polymerization initiators containing lanthanoid compounds or the like as main catalysts. Specific examples of the organic alkali metal compounds encompass: organic monolithium compounds such as n-butyllithium, sec-butyllithium, t-butyllithium, hexyllithium, phenyllithium, and stilbene lithium; organic multivalent lithium compounds such as dilithiomethane, 1,4-dilithiobutane, 1,4-dilithio-2-ethylcyclohexane, 1,3,5-trilithiobenzene, and 1,3,5-tris(lithiomethyl)benzene; organic sodium compounds such as sodium naphthalene; and organic potassium compounds such as potassium naphthalene. Examples of the organic alkaline-earth metal compounds encompass di-n-butylmagnesium, di-n-hexyl magnesium, diethoxy calcium, calcium distearate, di-t-butoxy strontium, diethoxy barium, diisopropoxy barium, diethyl mercapto barium, di-t-butoxy barium, diphenoxy barium, diethylamino barium, barium distearate, and diketyl barium. Examples of the polymerization initiators containing lanthanoid compounds as main catalysts encompass polymerization initiators each composed of a main catalyst and a cocatalyst. The main catalyst is, for example, a salt obtained from (i) a lanthanoid such as lanthanum, cerium, praseodymium, neodymium, samarium, and/or gadolinium and (ii) an acid such as a carboxylic acid and/or a phosphorated organic acid. The cocatalyst is, for example, an alkylaluminum compound, an organic aluminum hydride compound, and/or an organic aluminum halide compound. Among these polymerization initiators, organic monolithium compounds and organic multivalent lithium compounds are preferable, organic monolithium compounds are more preferable, and n-butyllithium is particularly preferable. Note that each of the organic alkali metal compounds can be allowed to react with a secondary amine compound such as dibutyl amine, dihexyl amine, dibenzylamine, pyrrolidine, hexamethyleneimine, and/or heptamethyleneimine (preferably pyrrolidine, hexamethyleneimine, and/or heptamethyleneimine) so as to be an organic alkali metal amide compound, before use. These polymerization initiators may be used individually or two or more polymerization initiators may be used in combination.

The amount of the polymerization initiator to be used can be determined according to a desired molecular weight, but is, for example, 30 mmol to 200 mmol, preferably 40 mmol to 150 mmol, and more preferably 40 mmol to 100 mmol, per 100 g of the isoprene monomers (monomer mixture).

The isoprene monomers (monomer mixture) are polymerized at a temperature of, for example, −80° C. to 150° C., preferably 0° C. to 100° C., and more preferably 20° C. to 90° C.

In order to control a vinyl bond content of the isoprene monomer units of the isoprene block, it is preferable to add a polar compound to the inert organic solvent when polymerization is carried out. Examples of the polar compound encompass: ether compounds such as dibutyl ether, tetrahydrofuran, and 2,2-di(tetrahydrofuryl)propane; tertiary amine compounds such as tetramethylethylene diamine; alkali metal alkoxides; and phosphine compounds. Among these polar compounds, ether compounds and tertiary amine compounds are preferable. Of these, polar compounds each capable of forming a chelate structure with a metal in the polymerization initiator are more preferable, and 2,2-di(tetrahydrofuryl)propane and tetramethylethylene diamine are particularly preferable. The amount of the polar compound to be used needs to be determined according to a desired vinyl bond content, but is in a range of preferably 0.01 mol to 100 mol, and more preferably 0.1 mol to 30 mol, with respect to 1 mol of the polymerization initiator. The amount of the polar compound within such ranges allows for easy control of the vinyl bond content of isoprene monomer units, and is less likely to deactivate the polymerization initiator and thus troubles associated with the deactivation are less likely to occur.

The vinyl bond content of the isoprene monomer units in the isoprene block is typically 0.10 wt % to 90 wt %, preferably 21 wt % to 90 wt %, more preferably 40 wt % to 85 wt %, and even more preferably 50 wt % to 80 wt %. The vinyl bond content of isoprene monomer units in the isoprene block within such ranges allow for production of a tire that has a better low-heat buildup property and better wet grip property. Note that, in this specification, the "vinyl bond content of isoprene monomer units" refers to a percentage of the total amount of isoprene monomer units each having a 1,2-structure or a 3,4-structure with respect to the total amount of all isoprene monomer units.

Note that there are no particular limitations on (i) the weight-average molecular weight of and the molecular weight distribution of an isoprene block which is present in a site other than the end opposite to the active end of a conjugated diene polymer chain and (ii) vinyl bond content of isoprene monomer units in the isoprene block.

(Part Other than Isoprene Block)

A part of a conjugated diene polymer chain which part is other than the isoprene block(s) of a conjugated diene polymer chain (such a part is hereinafter referred to as a non-isoprene-block part) is preferably (i) a homopolymer chain made up of conjugated diene monomers or (ii) a copolymer chain made up of conjugated diene monomers and aromatic vinyl monomers. The weight ratio of conjugated diene monomer units to aromatic vinyl monomer units (conjugated diene monomer units:aromatic vinyl monomer units) is preferably 100:0 to 50:50, more preferably 90:10 to 60:40, and even more preferably 85:15 to 70:30. The weight ratio of the conjugated diene monomer units to the aromatic vinyl monomer units within such ranges allows for easy production of a conjugated diene rubber of the present invention.

There is no particular limitation on the conjugated diene monomers contained in monomers (monomer mixture) which are used to form the non-isoprene-block part of the conjugated diene polymer chain. Examples of the conjugated diene monomers encompass: 1,3-butadiene, isoprene(2-methyl-1,3-butadiene), 2,3-dimethyl-1,3-butadiene, 2-chloro-1,3-butadiene, 1,3-pentadiene, and 1,3-hexadiene. Among these, 1,3-butadiene and isoprene are preferable, and 1,3-butadiene is especially preferable. These conjugated diene monomers may be used individually or two or more conjugated diene monomers may be used in combination. Note that, in a case of using isoprene, it is preferable that the amount of isoprene monomer units is less than 70 wt % for distinguishing such isoprene from the isoprene block(s).

Furthermore, there is no particular limitation on the aromatic vinyl monomers contained in the monomers (monomer mixture) used to form the conjugated diene polymer chain. Examples of the aromatic vinyl monomers include: styrene, α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, vinylnaphthalene, dimethylaminomethylstyrene, and dimethylaminoethylstyrene. Among these, styrene, α-methylstyrene, and 4-methylstyrene are preferable, and styrene is more preferable. These aromatic vinyl monomers may be used individually or two or more aromatic vinyl monomers may be used in combination.

The monomers (monomer mixture) can contain monomers other than the conjugated diene monomers and the aromatic vinyl monomers as necessary, provided that the essential properties of the present invention are not impaired.

Examples of such monomers encompass: α,β-unsaturated nitriles such as acrylonitrile and methacrylonitrile; unsaturated carboxylic acids and anhydrides thereof such as acrylic acid, methacrylic acid, and maleic anhydride; unsaturated carboxylic acid esters such as methyl methacrylate, ethyl acrylate, and butyl acrylate; and non-conjugated dienes such as 1,5-hexadiene, 1,6-heptadiene, 1,7-octadiene, dicyclopentadiene, and 5-ethylidene-2-norbornene. The amount of these monomers to be used is preferably 10 wt % or less, and more preferably 5 wt % or less, with respect to the weight of the monomers (monomer mixture).

An inert solvent to be used for polymerization of the monomers (monomer mixture) is the same as the foregoing inert solvent used to prepare the isoprene block.

A polymerization initiator used here for initiating the polymerization of the monomers (monomer mixture) is the isoprene block having an active end (hereinafter, such an isoprene block may also be referred as "isoprenyl-M" for short), which is the isoprene block described earlier. The amount of the polymerization initiator to be used needs to be determined according to a desired molecular weight, but is, for example, 5 mmol to 200 mmol, preferably 7 mmol to 150 mmol, and more preferably 10 mmol to 100 mmol per 100 g of the monomers (monomer mixture).

The monomers (monomer mixture) are polymerized at, for example, −80° C. to 150° C., preferably 0° C. to 100° C., and more preferably 20° C. to 90° C. The polymerization can be carried out either batchwise or continuously. In a case where the non-isoprene-block part of each conjugated diene polymer chain is to be in the form of (i) a copolymer chain made up of conjugated diene monomers and aromatic vinyl monomers or (ii) a copolymer chain made up of two or more kinds of conjugated diene monomers, the polymerization is preferably carried out batchwise because randomness of bonds is easily controlled.

In the case where the non-isoprene-block part of each conjugated diene polymer chain is to be in the form of (i) a copolymer chain made up of conjugated diene monomers and aromatic vinyl monomers or (ii) a copolymer chain made up of two or more kinds of conjugated diene monomers, the binding type of these monomers can be various types such as a block type, a tapering type, and a random type. Among these, a random type is preferable. In a case where it is desired that the binding type of the conjugated diene monomers and the aromatic vinyl monomers is a random type, it is preferable that polymerization is carried out while (i) the conjugated diene monomers or (ii) the conjugated diene monomers and the aromatic vinyl monomers are continuously or intermittently supplied into a polymerization system so that the percentage of the amount of the aromatic vinyl monomers with respect to a sum of the amount of the conjugated diene monomers and the amount of the aromatic vinyl monomers in the polymerization system is not too large.

In order to control the vinyl bond content of conjugated diene monomer units in the non-isoprene-block part of each conjugated diene polymer chain, it is preferable to add a polar compound to the inert organic solvent when polymerization is carried out, as is the case with the control of the vinyl bond content of the isoprene monomer units in the isoprene block. Note, however, that no further polar compounds need to be added in a case where, when the isoprene block was prepared, the polar compound was added to the inert organic solvent in an amount enough to control the vinyl bond content of the conjugated diene monomer units in the non-isoprene-block part of each conjugated diene polymer chain. Specific examples of the polar compound for controlling the vinyl bond content are the same as those used for preparing the isoprene block. The amount of the polar compound to be used needs to be determined according to a desired vinyl bond content, and is in a range of preferably 0.01 mol to 100 mol, and more preferably 0.1 mol to 30 mol, with respect to 1 mol of the polymerization initiator. The polar compound in an amount within such ranges allows for easy control of the vinyl bond content of the conjugated diene monomer units in the non-isoprene-block part of each conjugated diene polymer chain, and is less likely to deactivate the polymerization initiator and thus troubles associated with the deactivation are less likely to occur.

The vinyl bond content of the conjugated diene monomer units in the non-isoprene-block part of each conjugated diene polymer chain is preferably 10 wt % to 90 wt %, more preferably 30 wt % to 80 wt %, and even more preferably 40 wt % to 70 wt %. Since the conjugated diene monomer units in the non-isoprene-block part of each conjugated diene polymer chain have a vinyl bond content within such ranges, a resultant tire will have a better low-heat buildup property.

(Conjugated Diene Polymer Chain)

The weight-average molecular weight of conjugated diene polymer chains from which a conjugated diene rubber of the present invention is prepared, which conjugated diene polymer chains each has an active end at one end and has an isoprene block containing 70 wt % or more isoprene monomer units at least at the other end (hereinafter, such a conjugated diene polymer chain may be referred to as a "conjugated diene polymer chain (B)" for short), is not particularly limited. Note, however, that the weight-average molecular weight of the conjugated diene polymer chains (B) is preferably 1,000 to 2,000,000, more preferably 10,000 to 1,500,000, and more preferably 100,000 to 1,000,000. Conjugated diene polymer chains (B) having a weight-average molecular weight falling within such ranges give a tire which has well-balanced strength and low-heat buildup property.

A molecular weight distribution, which is represented as a ratio (Mw/Mn) of the weight-average molecular weight (Mw) of the conjugated diene polymer chains (B) to the number-average molecular weight (Mn) of the conjugated diene polymer chains (B), is preferably 1.0 to 3.0, more preferably 1.0 to 2.5, and even more preferably 1.0 to 2.2. Conjugated diene polymer chains (B) having a molecular weight distribution (Mw/Mn) within such ranges allow for easy production of a conjugated diene rubber of the present invention.

As described earlier, each of the conjugated diene polymer chains (B) can be obtained by (i) subjecting isoprene monomers (monomer mixture) to living polymerization in an inert solvent with the use of a polymerization initiator, thereby forming an isoprene block having an active end (such an isoprene block is referred to as isoprenyl-M) and then (ii) subjecting monomers (monomer mixture) containing conjugated diene monomers to living polymerization with use of the isoprenyl-M serving as a polymerization initiator. Note here that the isoprenyl-M may be added to a solution of the monomers (monomer mixture) containing the conjugated diene monomers. Alternatively, the monomers (monomer mixture) containing the conjugated diene monomers may be added to a solution of the isoprenyl-M. Note, however, that it is preferable to add the isoprenyl-M to a solution of the monomers (monomer mixture) containing the conjugated diene monomers. Furthermore, by adding additional isoprene monomers (monomer mixture) when 95% or more of the monomers (monomer mixture) containing the conjugated diene monomers have been polymerized, it is possible to obtain conjugated diene polymer chains (B) each having an isoprene block also at the active end. The amount of the additional isoprene monomers (monomer mixture) to be used here is preferably 10 mol to 100 mol, more preferably 15 mol to 70 mol, and even more preferably 20 mol to 35 mol, with respect to 1 mol of the polymerization initiator used for the initial polymerization.

The conjugated diene polymer chains (B) do not need to contain aromatic vinyl monomer units, but preferably contain aromatic vinyl monomer units. Preferable weight ratios of the conjugated diene monomer units to the aromatic vinyl monomer units (the conjugated diene monomer units:the aromatic vinyl monomer units) in the conjugated diene polymer chains (B) are the same as those for the foregoing non-isoprene-block part. Preferable vinyl bond contents of the conjugated diene monomer units in each of the conjugated diene polymer chains (B) are also the same as those for the foregoing non-isoprene-block part.

[Modifying Agent]

A conjugated diene rubber of the present invention is a rubber in which an active end(s) of at least part of conjugated diene polymer chains (B) is/are modified with a compound having a >C=O group as a functional group (hereinafter, such a compound may also be referred to as a "modifying agent (C) for short). The "functional group" in the present invention refers to a group that reacts with an active end of a conjugated diene polymer chain to bond with the conjugated diene polymer chain.

The modifying agent (C) is not limited provided that it is a compound having, per molecule, at least one >C=O group, and it is preferably a compound having, per molecule, at least one >C=O group and at least one substituted amino group. The >C=O group and the substituted amino group can be adjacent to each other or distant from each other. Examples of a compound in which the >C=O group and the substituted amino group are adjacent to each other encompass amide compounds, imide compounds, urea compounds, isocyanuric acid compounds, and isocyanate compounds, each of which has a —C(=O)—N< bond. Among these compounds, ring compounds are preferable, and N-substituted cyclic amide compounds or N-substituted cyclic urea compounds are more preferable. Examples of a compound in which the >C=O group and the substituted amino group are distant from each other encompass N-substituted aminoketone compounds and N-substituted aminoaldehyde compounds. Among these compounds, N-substituted aminoketone compounds are preferable. Compounds each having a >C=O group as a functional group are highly reactive with the active ends of the conjugated diene polymer chains (B). Especially a compound having a >C=O group and a substituted amino group in one molecule provides an excellent affinity between carbon black and modified conjugated diene polymer chains, when the conjugated diene polymer chains (B)'s active ends are modified with the compound (i.e., the modifying agent (C)).

Specific examples of the modifying agent (C) encompass: N-substituted cyclic amide compounds such as N-methyl-β-propiolactam, N-phenyl-β-propiolactam, N-methyl-2-pyrrolidone, N-vinyl-2-pyrrolidone, N-phenyl-2-pyrrolidone, N-t-butyl-2-pyrrolidone, N-methyl-5-methyl-2-pyrrolidone, N-methyl-2-piperidone, N-vinyl-2-piperidone, N-phenyl-2-piperidone, N-methyl-ε-caprolactam, N-phenyl-ε-caprolactam, N-methyl-ω-laurilolactam, and N-vinyl-ω-laurilolactam; N-substituted cyclic urea compounds such as 1,3-dimethylethyleneurea, 1,3-divinylethyleneurea, 1,3-diethyl-2-imidazolidinone, and 1-methyl-3-ethyl-2-imidazolidinone; N-substituted aminoketone compounds such as 4-N,N-dimethylaminoacetophenone, 4-N,N-diethylaminoacetophenone, 1,3-bis(diphenylamino)-2-propanone, 1,7-bis(methylethylamino)-4-heptanone, 4-N,N-dimethylaminobenzophenone, 4-N,N-di-t-butylaminobenzophenone, 4-N,N-diphenylaminobenzophenone, 4,4'-bis(dimethylamino)benzophenone, 4,4'-bis(diethylamino)benzophenone and 4,4'-bis(diphenylamino)benzophenone; and N-substituted amino aldehyde compounds such as 4-N,N-dimethylaminobenzaldehyde, 4,4-diphenylaminobenzaldehyde, and 4-N,N-divinylaminobenzaldehyde. Among these compounds, N-substituted cyclic amide compounds are preferable, and N-methyl-2-pyrrolidone and N-phenyl-2-pyrrolidone are particularly preferable.

One modifying agent (C) may be used solely or two or more modifying agents (C) may be used in combination.

The amount of the modifying agent (C) to be used is not particularly limited, and is selected as appropriate according to the type of the modifying agent (C) and a desired modification rate. The molar quantity of the modifying agent (C) with respect to 1 mol of the polymerization initiator (isoprenyl-M) used for the polymerization reaction is preferably 0.1 mol to 3.0 mol, more preferably 0.3 mol to 2.0 mol, and even more preferably 0.5 mol to 1.0 mol. When the modifying agent (C) is used in an amount within such ranges, (i) a rubber composition containing a conjugated diene rubber obtained by reaction of the modifying agent (C) with conjugated diene polymer chains (B) becomes easier to process and (ii) a tire obtained from the conjugated diene rubber has a better low-heat buildup property.

When the modifying agent (C) is to be added to a solution containing the conjugated diene polymer chains (B), it is preferable, for better control of the reaction, that the modifying agent (C) is dissolved in an inert solvent and then a solution containing the modifying agent (C) is added to a polymerizing system. The inert solvent is preferably used in such an amount that the solution of the modifying agent (C) has a concentration of 1 wt % to 50 wt %.

[Coupling Agent]

A conjugated diene rubber of the present invention can be arranged such that, by adding a coupling agent to a polymerization system, some of the conjugated diene polymer chains (B) are coupled. A preferable coupling agent is a coupling agent having six or more reactive sites per molecule, which reactive sites are reactive with the active ends of the conjugated diene polymer chains (B) (hereinafter, such a coupling agent may also be referred to as a "coupling agent (D)" for short), and a coupling agent having six reactive sites per molecule is more preferable. To be specific, the coupling agent (D) is more preferably a silicon compound represented by the following general formula (1):

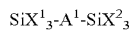
(1)

(wherein: $X^1$ and $X^2$ are each independently a halogen atom or a C1-C20 alkoxyl group; in a case where there are a plurality of $X^1$s or a plurality of $X^2$s, the plurality of $X^1$s or the plurality of $X^2$s, which may be the same or different, are each independently a halogen atom or an alkoxyl group; and $A^1$ is (a) a chemical single bond, (b) a C1-C20 polymethylene group (($CH_2)_k$ (k is an integer of 1 to 20), (c) a C6-C20 arylene group or (d) a C5-C20 cycloalkylene group.)

Among the silicon compounds represented by the general formula (1), those in which $A^1$ is a C1-C20 polymethylene group (($CH_2)_k$ (k is an integer of 1 to 20) are preferable. Among such silicon compounds, those in which k is an integer of 1 to 10 are further preferable, and those in which k is an integer of 1 to 6 are particularly preferable.

In a case where $X^1$ and $X^2$ in the general formula (1) are both halogen atoms, the silicon compound represented by the general formula (1) is a silicon halide compound. On the other hand, in a case where $X^1$ and $X^2$ in the general formula (1) are both C1-C20 alkoxyl groups, the silicon compound represented by the general formula (1) is an alkoxysilane compound. A silicon-halogen bond and a silicon-alkoxy bond are the same in their properties in that they both react with active ends of polymer chains through electrophilic substitution, but they are reactive to different degrees. The use of a silicon halide compound achieves more efficient coupling providing many branches. Therefore, the use of a silicon halide compound is more advantageous in improving strength of a tire, and is therefore preferable. Furthermore, $X^1$ and $X^2$ of the silicon halide compound are more preferably chlorine atoms.

Specific examples of the silicon halide compound represented by the general formula (1) encompass hexachlorodisilane, bis(trichlorosilyl)methane, 1,2-bis(trichlorosilyl)ethane, 1,3-bis(trichlorosilyl)propane, 1,4-bis(trichloro silyl) butane, 1,5-bis(trichlorosilyl)pentane, and 1,6-bis(trichlorosilyl)hexane. Among these, 1,2-bis(trichlorosilyl)ethane and 1,6-bis(trichlorosilyl)hexane are preferable.

These silicon halide compounds may be used individually or two or more silicon halide compounds may be used in combination.

Specific examples of the alkoxysilane compound represented by the general formula (I) encompass hexamethoxydisilane, hexaethoxydisilane, bis(trimethoxysilyl)methane, bis(triethoxysilyl)methane, bis(trimethoxysilyl)ethane, bis(triethoxysilyl)ethane, bis(trimethoxysilyl)propane, bis(triethoxysilyl)propane, bis(trimethoxysilyl)butane, bis(triethoxysilyl)butane, bis(trimethoxysilyl)heptane, bis(triethoxysilyl)heptane, bis(trimethoxysilyl)hexane, bis(triethoxysilyl)hexane, bis(trimethoxysilyl)benzene, bis(triethoxysilyl)benzene, bis(trimethoxysilyl)cyclohexane, bis(triethoxysilyl)cyclohexane, bis(triethoxysilyl)benzene, bis(3-trimethoxysilylpropyl)ethane, and bis(3-triethoxysilylpropyl)ethane. Among these, bis(trimethoxysilyl)ethane and bis(3-triethoxysilylpropyl)ethane are preferable.

Other examples of the coupling agent (D) encompass polyfunctional polysiloxane, bis(3-triethoxysilylpropyl)methylamine, and tris(trimethoxysilylmethyl)amine, each of which has six or more reactive sites such as a halogen atom(s) and/or an alkoxyl group(s).

The use of the coupling agent (D), especially a silicon halide compound having six or more silicon-halogen bonds per molecule or an alkoxysilane compound having six or more silicon-alkoxy bonds per molecule, in combination with the foregoing constituents provides a conjugated diene rubber having many branches. A tire obtained from such a conjugated diene rubber having many branches has a higher mechanical strength and a higher driveability.

The amount of the coupling agent (D) to be used is not particularly limited, and is selected as appropriate according to the type of the coupling agent (D) and a desired coupling rate. Note, however, that the coupling agent (D) is used in such an amount that the molar quantity of reactive sites of the coupling agent (D) with respect to 1 mol of the polymerization initiator (isoprenyl-M) used for the polymerization reaction is preferably 0.05 mol to 0.9 mol, more preferably 0.1 mol to 0.7 mol, and even more preferably 0.1 mol to 0.5 mol. The use of the coupling agent (D) in an amount within such ranges gives a higher mechanical strength, higher abrasion resistance, and a better driveability to a tire obtained from a rubber composition containing a conjugated diene rubber that is obtained by reaction of the coupling agent (D) with the conjugated diene polymer chains (B).

When the coupling agent (D) is added to a solution containing the conjugated diene polymer chains (B), it is preferable, for better control of the reaction, that the coupling agent (D) is dissolved in an inert solvent and then a solution containing the coupling agent (D) is added to a polymerization system. The inert solvent is preferably used in such an amount that the solution of the coupling agent (D) has a concentration of 1 wt % to 50 wt %.

(Other Additives)

Provided that the effects of the present invention are not impaired, a conjugated diene rubber of the present invention can be arranged such that active ends of some of the conjugated diene polymer chains (B) are inactivated by adding, to a polymerization system, (i) a polymerization terminator (described later), (ii) a polymer-chain-end-modifying agent other than the modifying agent (C), (iii) a coupling agent other than the coupling agent (D), and/or the like.

[Conjugated Diene Rubber]

A conjugated diene rubber of the present invention is a conjugated diene rubber in which an active end(s) of at least part of conjugated diene polymer chains (B) is/are modified with the modifying agent (C). In a case where coupling using the coupling agent (D) is not carried out, the active ends of preferably 10 wt % to 100 wt %, more preferably 25 wt % to 100 wt %, and even more preferably 50 wt % to 100 wt % of the conjugated diene polymer chains (B) are modified with the modifying agent (C). When conjugated diene polymer chains (B) having their active ends modified with the modifying agent (C) account for the above percentage (rate of modification with modifying agent (C)) (hereinafter, such a rate may also be referred to as "modification rate" for short) in the conjugated diene polymer chains (B) of the conjugated diene rubber, a rubber composition containing the conjugated diene rubber is easier to process and a tire obtained from the conjugated diene rubber has a higher mechanical strength, better wet grip property, and better low-heat buildup property.

The rate of modification with the modifying agent (C) can be determined by (i) calculating a ratio (UV/RI) of absorption intensity measured by an ultraviolet-visible spectrophotometer (UV) to refractive index difference measured by a differential refractometer (RI) for gel permeation chromatography and (ii) comparing the ratio (UV/RI) to a calibration curve which is prepared in advance.

The conjugated diene rubber of the present invention can be arranged such that active ends of some of the conjugated diene polymer chains (B) are coupled by reaction with the coupling agent (D). In particular, it is preferable that such conjugated diene polymer chains (B) are linked together via the coupling agent (D) so as to form a structure having four or more branches. In this case, such conjugated diene polymer chains (B) are linked together via a remaining part (remained after reaction) of the coupling agent (D) so as to form a structure having four or more branches. Note here that the modification rate and percentage of coupled polymer chains which form a structure(s) each having four or more branches (hereinafter, such a percentage may also be referred to as "coupling rate" for short (described later)) are preferably 10 wt % to 95 wt % and 5 wt % to 90 wt %, respectively, more preferably 30 wt % to 95 wt % and 5 wt % to 70 wt %, respectively, and even more preferably 50 wt % to 90 wt % and 10 wt % to 50 wt %, respectively. When the coupling rate is 5 wt % or more, a tire prepared from such a conjugated diene rubber has a higher mechanical strength, a higher abrasion resistance, and a higher driveability. When the coupling rate is 90 wt % or less, the conjugated diene rubber is easy to disperse filler therein when the filler is mixed therein, and allows for production of a tire having a better low-heat buildup property.

The percentage of coupled polymer chains which form a structure(s) each having four or more branches (coupling rate) can be determined in the following manner from a chart obtained as a result of gel permeation chromatography. A percentage of (a) the area of a peak having 3.5 times or more as large a peak top molecular weight as the peak top molecular weight having the smallest peak molecular weight with respect to (b) an entire eluted area in the chart is found. The percentage thus found is used as a weight fraction of polymer molecules, each of which is constituted by four or more conjugated diene polymer chains (B) linked together via the coupling agent (D) so as to form a structure having four or more branches. That is, the percentage thus found is used as the percentage (coupling rate) of coupled conjugated diene polymer chains (B) which form a structure(s) each having four or more branches. Note that the molecular weight measured here is based on polystyrene.

The conjugated diene rubber of the present invention can contain unmodified, uncoupled conjugated diene polymer chains (B) whose active ends are neither modified with the modifying agent (C) nor coupled by the coupling agent (D). In this case, such conjugated diene polymer chains (B) account for, for example, 20 wt % or less, preferably 10 wt % or less, and more preferably 5 wt % or less of all the conjugated diene polymer chains (B).

The modification of conjugated diene polymer chains (B) with the modifying agent (C) can be carried out by, for example, adding the modifying agent (C) to a solution containing the conjugated diene polymer chains (B). When to add the modifying agent (C) is not particularly limited, but it is desirable to add the modifying agent (C) while polymerization of the conjugated diene polymer chains (B) is not yet completed and the solution containing the conjugated diene polymer chains (B) still contains monomers. To be more specific, it is desirable to add the modifying agent (C) while the solution containing the conjugated diene polymer chains (B) still contains preferably 100 ppm or more of monomers, and more preferably 300 ppm to 50,000 ppm of monomers. By adding the modifying agent (C) in such a manner, it is possible to suppress side reactions of the conjugated diene polymer chains (B) with impurities in a polymerization system, to thereby provide better control of the reaction. Note that, in a case where the coupling agent (D) is added, the coupling agent (D) is added at a similar timing to the modifying agent (C) and the effect brought about by the addition of the coupling agent (D) in this manner is also similar to that of the modifying agent (C).

In a case where two or more agents such as two or more modifying agents (C) and/or two or more coupling agents (D) are used in combination in a process of obtaining a conjugated diene rubber of the present invention, there is no particular limitation on the order in which such agents are added to the polymerization system. Also in a case where the modifying agent (C) and the coupling agent (D) are used in combination, there is no particular limitation on the order in which such agents are to be added. Note, however, that the coupling agent (D) is preferably added before the modifying agent (C). By adding the coupling agent (D) and the modifying agent (C) in this order, it is easier to obtain a conjugated diene rubber containing many-branched structures constituted by polymer chains linked together via the coupling agent (D). A tire obtained from such a conjugated diene rubber has a higher mechanical strength and a better driveability.

The agents such as the modifying agent (C) and the coupling agent (D) are allowed to react with the conjugated diene polymer chains (B) under the conditions in which (i) a temperature is, for example, 0° C. to 100° C., preferably 30° C. to 90° C. and (ii) duration of a reaction for each agent is, for example, 1 minute to 120 minutes, and preferably 2 minutes to 60 minutes.

It is preferable that, after the modifying agent (C) (and the coupling agent (D) which is added as desired) is/are reacted with the conjugated diene polymer chains (B), a polymerization terminator such as alcohol (e.g., methanol or isopropanol) or water is added so that unreacted active ends are inactivated.

After the active ends of the conjugated diene polymer chains (B) are inactivated, the following are carried out. That is, (i) an antioxidant such as a phenolic stabilizer, a phosphorous stabilizer or a sulfur stabilizer, (ii) a crumbing agent, and/or (iii) a scale inhibitor is/are added to a polymer solution as needed. Then, by direct drying or steam stripping, a solvent is separated from the polymer solution, whereby a conjugated diene rubber of the present invention is recovered. Alternatively, extender oil may be mixed with the polymer solution before the solvent is separated from the polymer solution so that a conjugated diene rubber of the present invention in the form of an oil extended rubber is recovered.

Examples of the extender oil for use in recovering a conjugated diene rubber of the present invention in the form of an oil extended rubber encompass (i) petroleum softeners such as paraffinic softeners, aromatic softeners, and naphthenic softeners, (ii) plant softeners, and (iii) fatty acids. In a case where a petroleum softener is used, it is preferable that the amount of polycyclic aromatics is less than 3%. The amount of the polycyclic aromatics is measured by the IP346 method (a screening method developed by THE INSTITUTE PETROLEUM of the United Kingdom). In a case where extender oil is used, the amount of the extender oil with respect to 100 parts by weight of the conjugated diene rubber is, for example, 5 parts by weight to 100 parts by weight, preferably 10 parts by weight to 60 parts by weight, and more preferably 20 parts by weight to 50 parts by weight.

The weight-average molecular weight of the conjugated diene rubber of the present invention is not particularly limited, but it is, for example, 1,000 to 3,000,000, preferably 100,000 to 2,000,000, and more preferably 300,000 to 1,500,000, which is measured by gel permeation chromatography based on polystyrene. When the weight-average molecular weight of the conjugated diene rubber is 3,000,000 or less, the conjugated diene rubber is easy to mix with carbon black, and therefore is very easy to process. Furthermore, when the weight-average molecular weight of the conjugated diene rubber is 1,000 or more, the conjugated diene rubber allows for production of a tire having a better low-heat buildup property.

The molecular weight distribution represented as a ratio (Mw/Mn) of the weight-average molecular weight (Mw) to the number-average molecular weight (Mn) of the conjugated diene rubber of the present invention is not particularly limited, but it is preferably 1.1 to 3.0, more preferably 1.2 to 2.5, and even more preferably 1.3 to 2.2. When the molecular weight distribution (Mw/Mn) of the conjugated diene rubber is 3.0 or less, the conjugated diene rubber allows for production of a tire having a better low-heat buildup property.

Mooney viscosity ($ML_{1+4}$, 100° C.) of the conjugated diene rubber of the present invention is not particularly limited, but is, for example, 20 to 100, preferably 30 to 90, and more preferably 35 to 80. In a case where the conjugated diene rubber is in the form of an oil-extended rubber, it is preferable that the oil-extended rubber has a mooney viscosity falling in such ranges.

The conjugated diene rubber of the present invention, to which an ingredient(s) such as a cross-linking agent and/or filler is/are added, can be suitably used for various purposes. In particular, by adding carbon black as filler to the conjugated diene rubber, it is possible to obtain a rubber composition suitable for producing a tire that has a high strength, good low-heat buildup property, good wet grip property, and good driveability.

[Rubber Composition]

A rubber composition of the present invention contains (i) 100 parts by weight of a rubber component containing the foregoing conjugated diene rubber of the present invention and (ii) 10 parts by weight to 200 parts by weight of carbon black.

The rubber composition of the present invention can contain another rubber in addition to the conjugated diene rubber of the present invention. The another rubber is not particularly limited. Examples of the another rubber include: natural rubber, polyisoprene rubber, emulsion-polymerized styrene-butadiene copolymer rubber, solution-polymerized styrene-butadiene copolymer rubber, polybutadiene rubber (this may be polybutadiene rubber containing crystal fibers made up of 1,2-polybutadiene polymers), styrene-isoprene copolymer rubber, butadiene-isoprene copolymer rubber, styrene-isoprene-butadiene copolymer rubber, acrylonitrile-butadiene copolymer rubber, and acrylonitrile-styrene-butadiene copolymer rubber. Note, however, that the conjugated diene rubber of the present invention is excluded from the examples. Among these examples, natural rubber, polyisoprene rubber, polybutadiene rubber, and styrene-butadiene copolymer rubber are preferable. These rubbers may be used individually or two or more rubbers may be used in combination.

The conjugated diene rubber of the present invention accounts for preferably 10 wt % to 100 wt %, preferably 30 wt % to 100 wt %, and more preferably 50 wt % to 100 wt %, of the rubber component of the rubber composition of the present invention. By arranging a rubber composition such that the conjugated diene rubber of the present invention accounts for such a percentage of the rubber component, it is possible to obtain a rubber composition which allows for production of a tire having a particularly high strength, excellent low-heat buildup property, and excellent wet grip property.

The rubber composition of the present invention contains carbon black in an amount of 10 parts by weight to 200 parts by weight, preferably 20 parts by weight to 150 parts by weight, and more preferably 30 parts by weight to 120 parts by weight, with respect to 100 parts by weight of the rubber component. A tire obtained from a rubber composition of the present invention which contains such an amount of carbon black has a particularly excellent low-heat buildup property. The carbon black is not particularly limited, but examples of the carbon black encompass furnace black, acetylene black, thermal black, channel black, and graphite. Among these, furnace black is preferable. Examples of furnace black encompass SAF, ISAF, ISAF-HS, ISAF-LS, IISAF-HS, HAF, HAF-HS, HAF-LS, T-HS, T-NS, MAF, N234, and FEF. These kinds of carbon black may be used individually or two or more kinds of carbon black may be used in combination.

A nitrogen adsorption specific surface area ($N_2SA$) of the carbon black is preferably 5 $m^2/g$ to 200 $m^2/g$, more preferably 20 $m^2/g$ to 150 $m^2/g$, and even more preferably 40 $m^2/g$ to 130 $m^2/g$. A dibutyl phthalate (DBP) absorption amount of the carbon black is preferably 5 ml/100 g to 200 ml/100 g, more preferably 50 ml/100 g to 160 ml/100 g, and even more preferably 70 ml/100 g to 130 ml/100 g. When the nitrogen adsorption specific surface area of the carbon black falls within such ranges, it is possible to obtain a rubber composition which is easy to mold and allows for production of a tire having a particularly excellent low-heat buildup property.

How to add filler such as carbon black to the rubber composition is not particularly limited. For example, filler can be added to solid rubber and the filler and the rubber can be kneaded (dry blending). Alternatively, filler can be added to a rubber solution and then the solution can be coagulated and dried (wet blending).

It is preferable that the rubber composition of the present invention further contains a cross-linking agent. The cross-linking agent is not particularly limited, but examples of the cross-linking agent encompass sulfur, sulfur halides, organic peroxides, quinone dioxime compounds, organic multivalent amine compounds, and alkylphenol resin having a methylol group(s). Among these cross-linking agents, sulfur is preferable. The amount of the cross-linking agent to be mixed in the rubber composition is preferably 0.1 part by weight to 15 parts by weight, more preferably 0.5 part by weight to 5 parts by weight, and particularly preferably 1 part by weight to 4 parts by weight, with respect to 100 parts by weight of the rubber component of the rubber composition. Such an amount of the cross-linking agent achieves sufficient cross-linking, and therefore a resultant cross-linked rubber has an excellent mechanical property.

In a case of using sulfur or a sulfur-containing compound as the cross-linking agent, it is preferable to use a cross-linking accelerator and a cross-linking activator in combination with the cross-linking agent. The cross-linking accelerator is not particularly limited. Examples of the cross-linking accelerator encompass sulfenamide cross-linking accelerators, guanidinium cross-linking accelerators, thiourea cross-linking accelerators, thiazole cross-linking accelerators, thiuram cross-linking accelerators, dithiocarbamate cross-linking accelerators, and xanthate cross-linking accelerators. Among these cross-linking accelerators, those containing sulfenamide cross-linking accelerators are preferable. The cross-linking activator is not particularly limited. Examples of the cross-linking activator encompass: zinc oxide; and higher fatty acids such as stearic acid. The cross-linking accelerators are used individually or two or more cross-linking accelerators are used in combination. The same applies to the cross-linking activators.

The amount of the cross-linking accelerator to be mixed in the rubber composition and the amount of the cross-linking activator to be mixed in the rubber composition are each preferably 0.05 part by weight to 15 parts by weight, more preferably 0.5 part by weight to 10 parts by weight, and particularly preferably 1 part by weight to 5 parts by weight, with respect to 100 parts by weight of the rubber component of the rubber composition. Such an amount of the cross-linking accelerator and such an amount of the cross-linking activator achieve sufficient cross-linking, and therefore a resultant cross-linked rubber has an excellent mechanical property.

The rubber composition of the present invention can further contain, in addition to the foregoing components, ingredients which are usually used in the field of rubber processing, as appropriate depending on the purposes. Examples of such ingredients include: antioxidants, scorch retarders, activators, process oil, plasticizers, lubricants, filler (other than the aforementioned carbon black), and tackifiers.

In order to obtain a rubber composition of the present invention, it is only necessary to knead components by a standard method known in the art. For example, a desired rubber composition can be obtained by (i) kneading a rubber component and an ingredient(s) other than a cross-linking agent and a cross-linking accelerator to obtain a kneaded mixture and then (ii) mixing the cross-linking agent and the cross-linking accelerator in the kneaded mixture. The rubber component and the ingredient(s) other than the cross-linking agent and the cross-linking accelerator are kneaded preferably at 60° C. to 200° C., and more preferably 80° C. to 180° C., for preferably 30 seconds to 30 minutes. The cross-linking agent and the cross-linking accelerator are mixed in the kneaded mixture after the kneaded mixture cools down to, for example, 100° C. or less, preferably 80° C. or less.

The rubber composition of the present invention can be used as a tire after being cross-linked, and can be used as a rubber for reinforcing resins such as high-impact polystyrene or ABS resin, for example.

[Cross-Linked Rubber]

A cross-linked rubber of the present invention is prepared by cross-linking a rubber composition of the present invention. How to cross-link and shape the rubber composition of the present invention to obtain a rubber product (cross-linked rubber) such as a tire is not particularly limited, and can be selected according to the shape and size of a desired cross-linked rubber. A rubber composition containing a cross-linking agent can be put into a mold and then heated so that the rubber composition is cross-linked and molded simultaneously. Alternatively, a rubber composition containing a cross-linking agent can be molded in advance and then heated so as to be cross-linked. A temperature at which to mold the rubber composition is preferably 20° C. to 140° C. and more preferably 40° C. to 130° C. A temperature at which to cross-link the rubber composition is preferably 120° C. to 200° C. and more preferably 140° C. to 180° C. The rubber composition is subjected to a cross-linking treatment for, for example, 1 minute to 120 minutes.

The cross-linked rubber of the present invention is for use in rubber products such as tires, hoses, window frames, belts, shoe soles, vibration insulator rubbers, automobile parts, and seismic isolation rubbers. The cross-linked rubber of the present invention is especially suitable for tires, because the cross-linked rubber has an excellent strength, good low-heat buildup property, and excellent wet grip property. The cross-linked rubber of the present invention is applicable to, for example, various parts such as treads, carcasses, side walls, and beads of various tires such as all-season tires, high-performance tires, and studless tires. Since the cross-linked rubber of the present invention is especially excellent in low-heat buildup property, it is particularly suitable for a tread of a fuel-efficient tire.

As has been described, in order to attain the object, a conjugated diene rubber of the present invention is a conjugated diene rubber prepared from conjugated diene polymer chains, wherein the conjugated diene polymer chains each has an active end at one end and an isoprene block at least at the other end, the isoprene block containing 70 wt % or more isoprene monomer units, and the active ends of at least part of the conjugated diene polymer chains are modified with a compound having a >C=O group as a functional group.

It is preferable to configure the conjugated diene rubber of the present invention such that the conjugated diene polymer chains contain 50 wt % to 100 wt % conjugated diene monomer units and 0 wt % to 50 wt % aromatic vinyl monomer units.

It is preferable to configure the conjugated diene rubber of the present invention such that 10 wt % to 100 wt % of the conjugated diene polymer chains are modified with the compound having the >C=O group.

It is preferable to configure the conjugated diene rubber of the present invention such that active ends of some of the conjugated diene polymer chains are coupled by reaction with a coupling agent that has six or more reactive sites per molecule, which reactive sites are reactive with the active ends.

It is preferable to configure the conjugated diene rubber of the present invention such that: 10 wt % to 95 wt % of the conjugated diene polymer chains are modified with the compound having the >C=O group; and 5 wt % to 90 wt % of the conjugated diene polymer chains are coupled via the coupling agent to form a structure(s) having four or more branches.

The present invention further provides a rubber composition including 100 parts by weight of a rubber component which contains the conjugated diene rubber and 10 parts by weight to 200 parts by weight of carbon black.

It is preferable to configure the rubber composition of the present invention further including a cross-linking agent.

The present invention further provides a cross-linked rubber which is prepared by cross-linking the rubber composition.

The present invention further provides a tire including the cross-linked rubber of the present invention.

The following description will discuss the embodiment of the present invention in more detail with Examples. Needless to say, the present invention is not limited to Examples described below, but the details of Examples can be modified in various manners. Furthermore, the present invention is not limited to the description of the embodiment, but can be altered in many ways by a person skilled in the art within the scope of the claims. An embodiment derived from a proper combination of technical means disclosed in different embodiments is also encompassed in the technical scope of the present invention.

Note that "part" and "%" mentioned in Examples below are based on weight unless specifically stated otherwise.

EXAMPLES

[Evaluation Method]
Physical properties were evaluated by the following methods.

(Weight-Average Molecular Weight, Molecular Weight Distribution, and Coupling Rate)

Weight-average molecular weight, molecular weight distribution, and coupling rate were calculated from a chart which shows molecular weight based on polystyrene and is obtained by gel permeation chromatography. The gel permeation chromatography was carried out under the following specific conditions:

Instrument: HLC-8020 (manufactured by Tosoh Corporation)

Column: GMH-HR-H (manufactured by Tosoh Corporation) Two columns were connected in series.

Detector: Differential Refractometer RI-8020 (manufactured by Tosoh Corporation)

Eluant: Tetrahydrofuran

Column Temperature: 40° C.

The coupling rate was determined in the following manner. A percentage of (i) the area of a peak having 3.5 times or more as large a peak top molecular weight as the peak top molecular weight having the smallest peak molecular weight with respect to (ii) an entire eluted area in the chart was found. The percentage thus found was used as the percentage (coupling rate) of coupled conjugated diene polymer chains which form a structure(s) each having four or more branches.

(Modification Rate)

Modification rate was determined by (i) calculating a ratio (UV/RI) of absorption intensity measured by an ultraviolet-visible spectrophotometer (UV) to refractive index difference measured by the differential refractometer (RI) for gel permeation chromatography and (ii) comparing the ratio (UV/RI) to a calibration curve which was prepared in advance.

Detector: Ultraviolet-Visible spectrophotometer UV-8020 (manufactured by Tosoh Corporation)

(Styrene unit Content and Vinyl Bond Content)

Styrene unit content and vinyl bond content were measured by $^1$H-NMR.

(Mooney Viscosity ($ML_{1+4}$, 100° C.))

Mooney viscosity was measured with use of a mooney viscometer (manufactured by Shimadzu Corporation) in accordance with JIS K6300.

(Tensile Strength)

Tensile strength was measured in the following manner. A tensile test was conducted in accordance with JIS K6301, and a stress at 300% stretch was measured. The tensile strength is represented as a relative value relative to the tensile strength (taken as 100) obtained in Comparative Example 5 described later. A cross-linked rubber having a greater value has a greater tensile strength.

(Wet Grip Property)

Wet grip property was measured in the following manner. A test piece measuring 50 mm in length, 12.7 mm in width, and 2 mm in thickness was measured for tan δ with use of ARES manufactured by Rheometrics, Inc., under conditions in which dynamic strain was 0.5%, frequency was 10 Hz, and temperature was 0° C. The wet grip property is represented as a relative value relative to the wet grip property (taken as 100) obtained in Comparative Example 5 described later. A cross-linked rubber having a greater value shows a better wet grip property when used in a tire.

(Low-Heat Buildup Property)

Low-heat buildup property was measured in the following manner. A test piece measuring 50 mm in length, 12.7 mm in width, and 2 mm in thickness was measured for tan δ with use of ARES manufactured by Rheometrics, Inc., under conditions in which dynamic strain was 2.0%, frequency was 10 Hz, and temperature was 60° C. The low-heat buildup property is represented as a relative value relative to the low-heat buildup property (taken as 100) obtained in Comparative Example 5 described later. A cross-linked rubber having a smaller value shows a better low-heat buildup property when used in a tire.

[Preparation of Initiator 1]

400 g of cyclohexane and 76.8 mmol of tetramethylethylenediamine were placed in a 800-ml glass bottle in which air had been replaced with nitrogen, and then 48.0 mmol of n-butyllithium was added to the glass bottle to obtain a mixture. Next, 96 g of isoprene was gradually added to the mixture, and the mixture was allowed to react in a water tank at 60° C. for 120 minutes. In this way, an initiator 1 was obtained. The initiator 1 was measured for its weight-average molecular weight, molecular weight distribution, and vinyl bond content. The results of the measurements are shown in Table 1.

[Preparation of Initiator 2]

400 g of cyclohexane and 30.7 mmol of tetramethylethylenediamine were placed in a 800-ml glass bottle in which air had been replaced with nitrogen, and then 19.2 mmol of n-butyllithium was added to the glass bottle to obtain a mixture. Next, a liquid mixture of 88 g of isoprene and 8 g of styrene was gradually added to the mixture with stirring, and the mixture was allowed to react in a water tank at 60° C. for 120 minutes. In this way, an initiator 2 was obtained. The initiator 2 was measured for its weight-average molecular weight, molecular weight distribution, styrene unit content, and vinyl bond content. The results of the measurements are shown in Table 1.

Example 1

Preparation of Conjugated Diene Rubber I 4000 g of cyclohexane, 357.7 g of 1,3-butadiene, and 132.3 g of styrene were introduced into an autoclave having a stirrer in a nitrogen atmosphere. Then, 2.70 mmol (based on lithium) of the initiator 1 was added to the autoclave, and thereby polymerization was initiated at 40° C. After 10 minutes from the initiation of the polymerization, 195.3 g of 1,3-butadiene and 14.7 g of styrene were continually added over 60 minutes. The maximum temperature that was reached during the polymerization was 60° C. After completion of the continual addition of the 1,3-butadiene and the styrene, a mixture was subjected to polymerization reaction for more 20 minutes. Then, it was confirmed that 95% to 100% of monomers had been polymerized. Then, xylene containing 2.70 mmol of N-methyl-2-pyrrolidone (a xylene solution containing 20 wt % N-methyl-2-pyrrolidone) was added to the mixture, and the mixture was allowed to react for 30 minutes. After that, 5.4 mmol of methanol serving as a polymerization terminator was added, whereby a solution containing a conjugated diene rubber I was obtained. To the solution, IRGANOX1520L (manufactured by Ciba Specialty Chemicals Corporation) serving as an antioxidant was added in an amount 0.15 part with respect to 100 parts of the conjugated diene rubber I. After that, solvent was removed from the solution by steam stripping, and a remainder was dried in vacuum at 60° C. for 24 hours. In this way, a solid conjugated diene rubber I was obtained.

The solid conjugated diene rubber I was measured for its weight-average molecular weight, molecular weight distribution, coupling rate, modification rate, styrene unit content, vinyl bond content, and mooney viscosity. The results of the measurements are shown in Table 1.

TABLE 1

|  | Example 1 | Example 2 | Example 3 | Example 4 | CE 1 | CE 2 | CE 3 |
|---|---|---|---|---|---|---|---|
| Initiator *[1] | Initiator 1 IP-Li | Initiator 1 IP-Li | Initiator 2 SI-Li | Initiator 2 SI-Li | Initiator 1 IP-Li | n-BuLi | n-BuLi |
| WAMW of IB ($\times 10^4$) | 0.31 | 0.31 | 0.73 | 0.73 | 0.31 | — | — |
| Styrene Unit Content of IB (wt %) | — | — | 8.2 | 8.2 | — | — | — |
| Isoprene Unit Content of IB (wt %) | 100 | 100 | 91.8 | 91.8 | 100 | — | — |
| Vinyl Bond Content of IB (wt %) | 66.8 | 66.8 | 68.2 | 68.2 | 66.8 | — | — |
| MWD of IB (Mw/Mn) | 1.08 | 1.08 | 1.05 | 1.05 | 1.08 | — | — |
| Coupling Agent | — | 1,2-bis(trichlorosilyl)ethane | — | 1,6-bis(trichlorosilyl)hexane | — | — | — |
| Modifying Agent*[2] | NMP | NPP | NPP | NMP | $SnCl_4$ | $SnCl_4$ | NPP |
| Results of Measuring CDR |  |  |  |  |  |  |  |
| Styrene Unit Content (wt %) | 20.9 | 19.6 | 21.1 | 20.8 | 19.7 | 21 | 20.3 |
| Vinyl Bond Content (wt %) | 63.2 | 59.4 | 62.2 | 62.4 | 59.2 | 62.2 | 57.1 |
| WAMW ($\times 10^4$) | 40.7 | 44.5 | 38.8 | 47 | 78.8 | 76.7 | 24 |
| MWD (Mw/Mn) | 1.03 | 1.45 | 1.04 | 1.5 | 1.26 | 1.30 | 1.03 |
| 4-or-More-Branches Coupling Rate (%) | 0.0 | 24.8 | 0.0 | 16.8 | 0.0 | 0.0 | 0.0 |
| Modification Rate (%) | 100 | 75 | 100 | 83 | —[X3] | —[X3] | 100 |
| Mooney Viscosity ($ML_{1+4}$, 100° C.) | 70.8 | 38.6 | 68.3 | 44.7 | 94.1 | 95.3 | 17.8 |

*[1] IP-Li: Isoprenyl-Lithium (containing only isoprene as monomer units), SI-Li: Isoprenyl-Lithium (containing styrene and isoprene as monomer units)

*[2] NMP: N-methyl-2-pyrrolidone, NPP: N-phenyl-2-pyrrolidone

[X3] The modification rate of $SnCl_4$ is not recorded because the absorption intensity cannot be measured by UV.

Note, however, that the modification rate of $SnCl_4$ is 100% in theory.

Abbreviation List:

CE: Comparative Example, WAMW: Weight-Average Molecular Weight, IB: Isoprene Block, MWD: Molecular Weight Distribution, CDR: Conjugated diene rubber

Example 2

Preparation of Conjugated Diene Rubber II 4000 g of cyclohexane, 357.7 g of 1,3-butadiene, and 132.3 g of styrene were introduced into an autoclave having a stirrer in a nitrogen atmosphere. Then, 4.12 mmol (based on lithium) of the initiator 1 was added to the autoclave, and thereby polymerization was initiated at 40° C. After 10 minutes from the initiation of the polymerization, 195.3 g of 1,3-butadiene and 14.7 g of styrene were continually added over 60 minutes. The maximum temperature that was reached during the polymerization was 60° C. After completion of the continual addition of the 1,3-butadiene and the styrene, a mixture was subjected to polymerization reaction for more 20 minutes. Then, it was confirmed that 95% to 100% of monomers had been polymerized. Then, cyclohexane containing 0.14 mmol of 1,2-bis(trichlorosilyl)ethane (a cyclohexane solution containing 20 wt % 1,2-bis(trichlorosilyl)ethane) was added to the mixture, and the mixture was allowed to react for 10 minutes. Furthermore, xylene containing 4.12 mmol of N-phenyl-2-pyrrolidone (a xylene solution containing 20 wt % N-phenyl-2-pyrrolidone) was added to the mixture, and the mixture was allowed to react for 30 minutes. After that, 8.2 mmol of methanol serving as a polymerization terminator was added, whereby a solution containing a conjugated diene rubber II was obtained. To the solution, IRGANOX1520L (manufactured by Ciba Specialty Chemicals Corporation) serving as an antioxidant was added in an amount of 0.15 part with respect to 100 parts of the conjugated diene rubber II. After that, solvent was removed from the solution by steam stripping, and a remainder was dried in vacuum at 60° C. for 24 hours. In this way, a solid conjugated diene rubber II was obtained.

The solid conjugated diene rubber II was measured for its weight-average molecular weight, molecular weight distribution, coupling rate, modification rate, styrene unit content, vinyl bond content, and mooney viscosity. The results of measurements are shown in Table 1.

Example 3

Preparation of Conjugated Diene Rubber III 4000 g of cyclohexane, 357.7 g of 1,3-butadiene, and 132.3 g of styrene were introduced into an autoclave having a stirrer in a nitrogen atmosphere. Then, 2.70 mmol (based on lithium) of the initiator 2 was added to the autoclave, and thereby polymerization was initiated at 40° C. After 10 minutes from the initiation of the polymerization, 195.3 g of 1,3-butadiene and 14.7 g of styrene were continually added over 60 minutes. The maximum temperature that was reached during the polymerization was 60° C. After completion of the continual addition of the 1,3-butadiene and the styrene, a mixture was subjected to polymerization reaction for more 20 minutes. Then, it was confirmed that 95% to 100% of monomers had been polymerized. Then, xylene containing 2.70 mmol of N-methyl-2-pyrrolidone (a xylene solution containing 20 wt % N-phenyl-2-pyrrolidone) was added to the mixture, and the mixture was allowed to react for 30 minutes. After that, 5.4 mmol of methanol serving as a polymerization terminator was added, whereby a solution containing a conjugated diene rubber III was obtained. To the solution, IRGANOX1520L (manufactured by Ciba Specialty Chemicals Corporation) serving as an antioxidant was added in an amount of 0.15 part with respect to 100 parts of the conjugated diene rubber III. After that, solvent was removed from the solution by steam stripping, and a remainder was dried in vacuum at 60° C. for 24 hours. In this way, a solid conjugated diene rubber III was obtained.

The solid conjugated diene rubber III was measured for its weight-average molecular weight, molecular weight distribution, coupling rate, modification rate, styrene unit content, vinyl bond content, and mooney viscosity. The results of the measurements are shown in Table 1.

Example 4

Preparation of Conjugated Diene Rubber IV 4000 g of cyclohexane, 357.7 g of 1,3-butadiene, and 132.3 g of styrene were introduced into an autoclave having a stirrer in a nitrogen atmosphere. Then, 4.12 mmol (based on lithium) of the initiator 2 was added to the autoclave, and thereby polymerization was initiated at 40° C. After 10 minutes from the initiation of the polymerization, 195.3 g of 1,3-butadiene and 14.7 g of styrene were continually added over 60 minutes. The maximum temperature that was reached during the polymerization was 60° C. After completion of the continual addition of the 1,3-butadiene and the styrene, a mixture was subjected to polymerization reaction for more 20 minutes. Then, it was confirmed that 95% to 100% of monomers had been polymerized. Then, cyclohexane containing 0.11 mmol of 1,6-bis(trichlorosilyl)hexane (a cyclohexane solution containing 20 wt % 1,6-bis(trichlorosilyl)hexane) was added to the mixture, and the mixture was allowed react for 10 minutes. Furthermore, xylene containing 4.12 mmol of N-methyl-2-pyrrolidone (a xylene solution containing 20 wt % N-methyl-2-pyrrolidone) was added to the mixture, and the mixture was allowed to react for 30 minutes. After that, 8.2 mmol of methanol serving as a polymerization terminator was added to the mixture, whereby a solution containing a conjugated diene rubber IV was obtained. To the solution, IRGANOX1520L (manufactured by Ciba Specialty Chemicals Corporation) serving as an antioxidant was added in an amount of 0.15 part with respect to 100 parts of the conjugated diene rubber IV. After that, solvent was removed from the solution by steam stripping, and a remainder was dried in vacuum at 60° C. for 24 hours. In this way, a solid conjugated diene rubber IV was obtained.

The solid conjugated diene rubber IV was measured for its weight-average molecular weight, molecular weight distribution, coupling rate, modification rate, styrene unit content, vinyl bond content, and mooney viscosity. The results of the measurements are shown in Table 1.

Comparative Example 1

Preparation of Conjugated Diene Rubber i 4000 g of cyclohexane, 357.7 g of 1,3-butadiene, and 132.3 g of styrene were introduced into an autoclave having a stirrer in a nitrogen atmosphere. Then, 4.12 mmol (based on lithium) of the initiator 1 was added to the autoclave, and thereby polymerization was initiated at 40° C. After 10 minutes from the initiation of the polymerization, 195.3 g of 1,3-butadiene and 14.7 g of styrene were continually added over 60 minutes. The maximum temperature that was reached during the polymerization was 60° C. After completion of the continual addition of the 1,3-butadiene and the styrene, a mixture was subjected to polymerization reaction for more 20 minutes. Then, it was confirmed that 95% to 100% of monomers had been polymerized. Then, cyclohexane containing 4.12 mmol of tin tetrachloride (a cyclohexane solution containing 20 wt % tin tetrachloride) was added to the mixture, and the mixture was allowed to react for 30 minutes. After that, 8.2 mmol of methanol serving as a polymerization terminator was added, whereby a solution containing a conjugated diene rubber i was obtained. To the solution, IRGANOX1520L (manufactured by Ciba Specialty Chemicals Corporation) serving as an antioxidant was added in an amount of 0.15 part with respect to 100 parts of the conjugated diene rubber i. After that, solvent was removed from the solution by steam stripping, and a remainder was dried in vacuum at 60° C. for 24 hours. In this way, a solid conjugated diene rubber i was obtained.

The solid conjugated diene rubber i was measured for its weight-average molecular weight, molecular weight distribution, coupling rate, modification rate, styrene unit content, vinyl bond content, and mooney viscosity. The results of the measurements are shown in Table 1.

Comparative Example 2

Preparation of Conjugated Diene Rubber ii 4000 g of cyclohexane, 357.7 g of 1,3-butadiene, and 132.3 g of styrene were introduced into an autoclave having a stirrer in a nitrogen atmosphere. Then, 6.6 mmol of tetraethylenediamine was added, and 4.1 mmol of n-butyllithium was added, whereby polymerization was initiated at 40° C. After 10 minutes from the initiation of the polymerization, 195.3 g of 1,3-butadiene and 14.7 g of styrene were continually added over 60 minutes. The maximum temperature that was reached during the polymerization was 60° C. After completion of the continual addition of the 1,3-butadiene and the styrene, a mixture was subjected to polymerization reaction for more 20 minutes. Then, it was confirmed that 95% to 100% of monomers had been polymerized. Then, cyclohexane containing 4.12 mmol of tin tetrachloride (a cyclohexane solution containing 20 wt % tin tetrachloride) was added to the mixture, and the mixture was allowed to react for 30 minutes. After that, 8.2 mmol of methanol serving as a polymerization terminator was added, whereby a solution containing a conjugated diene rubber ii was obtained. To the solution, IRGANOX1520L (manufactured by Ciba Specialty Chemicals Corporation) serving as an antioxidant was added in an amount of 0.15 part with respect to 100 parts of the conjugated diene rubber ii. After that, solvent was removed from the solution by steam stripping, and a remainder was dried in vacuum at 60° C. for 24 hours. In this way, a solid conjugated diene rubber ii was obtained.

The solid conjugated diene rubber ii was measured for its weight-average molecular weight, molecular weight distribution, coupling rate, modification rate, styrene unit content, vinyl bond content, and mooney viscosity. The results of the measurements are shown in Table 1.

Comparative Example 3

Preparation of Conjugated Diene Rubber iii 4000 g of cyclohexane, 357.7 g of 1,3-butadiene, and 132.3 g of styrene were introduced into an autoclave having a stirrer in a nitrogen atmosphere. Then, 6.6 mmol of tetraethylenediamine was added, and 4.1 mmol of n-butyllithium was added, whereby polymerization was initiated at 40° C. After 10 minutes from the initiation of the polymerization, 195.3 g of 1,3-butadiene and 14.7 g of styrene were continually added over 60 minutes. The maximum temperature that was reached during the polymerization was 60° C. After completion of the continual addition of the 1,3-butadiene and the styrene, a mixture was subjected to polymerization reaction for more 20 minutes. Then, it was confirmed that 95% to 100% of monomers had been polymerized. Then, xylene containing 4.12 mmol of N-phenyl-2-pyrrolidone (a xylene solution containing 20 wt % N-phenyl-2-pyrrolidone) was added, and the mixture was allowed to react for 30 minutes. After that, 8.2 mmol of methanol serving as a polymerization terminator was added, whereby a solution containing a conjugated diene rubber iii was obtained. To the solution, IRGANOX1520L (manufactured by Ciba Specialty Chemicals Corporation) serving as an antioxidant was added in an amount of 0.15 part with respect to 100 parts of the conjugated diene rubber iii. After that, solvent was removed from the solution by steam stripping, and a remainder was dried in vacuum at 60° C. for 24 hours. In this way, a solid conjugated diene rubber iii was obtained.

The solid conjugated diene rubber iii was measured for its weight-average molecular weight, molecular weight distribution, coupling rate, modification rate, styrene unit content, vinyl bond content, and mooney viscosity. The results of the measurements are shown in Table 1.

Example 5

Evaluation of Properties of Rubber Composition Containing Conjugated Diene Rubber I 70 parts of the conjugated diene rubber I, which was obtained in Example 1, and 30 parts of butadiene rubber (product name "BR1220": manufactured by Zeon Corporation) were masticated with the use of a 250-ml Banbury mixer, whereby a masticated rubber was obtained. Then, to the masticated rubber, (i) 50 parts of carbon black (product name "SEAST 6": manufactured by Tokai Carbon Co., Ltd., nitrogen adsorption specific surface area (measured by BET method): 119 m$^2$/g), (ii) 10 parts of process oil (product name "Fukkol Elamic 30": manufactured by NIPPON OIL CORPORATION), (iii) 3 parts of zinc oxide, (iv) 2 parts of stearic acid, and (v) 2 parts of an antioxidant (N-phenyl-N'-(1,3-dimethylbutyl)-p-phenylenediamine, product name "Noclac 6C", manufactured by Ouchi Shinko Chemical Industrial Co., Ltd.) were added to obtain a mixture, and the mixture was kneaded for 3 minutes with an initiating temperature of 80° C., whereby a rubber composition was obtained. Thereafter, the rubber composition was discharged from the Banbury mixer. The temperature of the rubber composition at the completion of the kneading was 120° C. Next, the rubber composition thus obtained, 1.5 parts of sulfur, and 1.1 parts of a cross-linking accelerator (N-cyclohexyl-2-benzothiazolyl sulfenamide, product name "Nocceler CZ-G", manufactured by Ouchi Shinko Chemical Industrial Co., Ltd.) were kneaded with the use of an open roll at 50° C. Then, a sheet-shaped rubber composition was taken out.

The sheet-shaped rubber composition was cross-linked by pressing at 160° C. for 15 minutes, whereby a test piece was obtained. The test piece was evaluated for its tensile strength, wet grip property, and low-heat buildup property. The results are shown in Table 2.

TABLE 2

|  | E5 | E6 | E7 | E8 | CE4 | CE 5 | CE 6 |
|---|---|---|---|---|---|---|---|
| Conjugated Diene Rubber Used (Symbols) | I | II | III | IV | i | ii | iii |
| Results |  |  |  |  |  |  |  |
| Tensile Strength | 107 | 114 | 108 | 114 | 107 | 100 | 105 |
| Wet Grip Property | 106 | 106 | 107 | 108 | 101 | 100 | 104 |
| LHB Property | 76 | 73 | 74 | 77 | 85 | 100 | 82 |

*Tensile strength, wet grip property and low-heat buildup property are represented as relative values relative to those of Comparative Example 5 which are taken as 100.
Abbreviation List:
E: Example, CE: Comparative Example, LHB Property: Low-Heat Buildup Property Examples 6 through 8 (Evaluations of Conjugated Diene Rubbers II through IV) and Comparative Examples 4 Through 6 (Evaluations of Conjugated Diene Rubbers i Through iii The same operations as in Example 5 were repeated except that, instead of the conjugated diene rubber I, (a) the same amount of the conjugated diene rubber II obtained in Example 2 was used in Example 6, (b) the same amount of the conjugated diene rubber III obtained in Example 3 was used in Example 7, (c) the same amount of the conjugated diene rubber IV obtained in Example 4 was used in Example 8, (d) the same amount of the conjugated diene rubber i obtained in Comparative Example 1 was used in Comparative Example 4, (e) the same amount of the conjugated diene rubber ii obtained in Comparative Example 2 was used in Comparative Example 5 and (f) the same amount of the conjugated diene rubber iii obtained in Comparative Example 3 was used in Comparative Example 6. In this way, rubber compositions of Examples 6 to 8 and rubber compositions of Comparative Examples 4 to 6 were obtained. Test pieces of the respective rubber compositions were evaluated. The results are shown in Table 2.

The results showed the following. That is, cross-linked rubbers (the equivalents of tires) prepared from the rubber compositions of the present inventions (Examples 5 through 8) containing the conjugated diene rubbers of Examples 1 through 4, respectively, each of which corresponds to a conjugated diene rubber of the present invention, were excellent in all of the following properties: tensile strength, low-heat buildup property, and wet grip property, as compared to those prepared from (i) the rubber composition (of Comparative Example 4) containing the conjugated diene rubber (of Comparative Example 1) whose molecule has an end modified with tin tetrachloride, which end is opposite to an end having an isoprene block and (ii) the rubber compositions (of Comparative Examples 5 and 6) containing the conjugated diene rubbers (of Comparative Examples 2 and 3, respectively) whose molecule has no isoprene block at an end opposite to an end modified with a modifying agent.

Industrial Applicability

The present invention can be used in any industrial field in which rubber, resin and the like are used, and is particularly suitable for rubber products such as tires.

The invention claimed is:

1. A conjugated diene rubber prepared from conjugated diene polymer chains, wherein the conjugated diene polymer chains each has an active end at one end and an isoprene block at least at the other end, the isoprene block contains 70 wt % or more isoprene monomer units, and the active ends of at least part of the conjugated diene polymer chains are modified with a compound having a $>C=O$ group as a functional group;

wherein a weight-average molecular weight of the conjugated diene polymer chains is 100,000 to 1,000,000.

2. The conjugated diene rubber as set forth in claim 1, wherein the conjugated diene polymer chains contain 50 wt % to 100 wt % conjugated diene monomer units and 0 wt % to 50 wt % aromatic vinyl monomer units.

3. The conjugated diene rubber as set forth in claim 1, wherein 10 Wt % to 100 wt % of the conjugated diene polymer chains are modified with the compound having the $>C=O$ group.

4. The conjugated diene rubber as set forth in claim 1, wherein active ends of some of the conjugated diene polymer chains are coupled by reaction with a coupling agent that has six or more reactive sites per molecule, which reactive sites are reactive with the active ends.

5. The conjugated diene rubber as set forth in claim 4, wherein:

10 wt % to 95 wt % of the conjugated diene polymer chains are modified with the compound having the $>C=O$ group; and 5 wt % to 90 wt % of the conjugated diene polymer chains are coupled via the coupling agent to form a structure(s) having four or more branches.

6. A rubber composition, comprising:

100 parts by weight of a rubber component which contains a conjugated diene rubber as set forth in claims 1; and 10 parts by weight to 200 parts by weight of carbon black.

7. A rubber composition as set forth in claim 6, further comprising a cross-linking agent.

8. A cross-linked rubber which is prepared by cross-linking a rubber composition as set forth in claim 7.

9. A tire comprising a cross-linked rubber as set forth in claim 8.

10. The conjugated diene rubber as set forth in claim 1, wherein a vinyl bond content of the isoprene monomer units in the isoprene block is 50 wt % to 80 wt %.

11. The conjugated diene rubber as set forth in claim 10, wherein the compound having the $>C=O$ group has a substituted amino group.

* * * * *